W. A. RAINVILLE.
BABY CARRIAGE.
APPLICATION FILED MAR. 6, 1918.
1,318,592.    Patented Oct. 14, 1919.
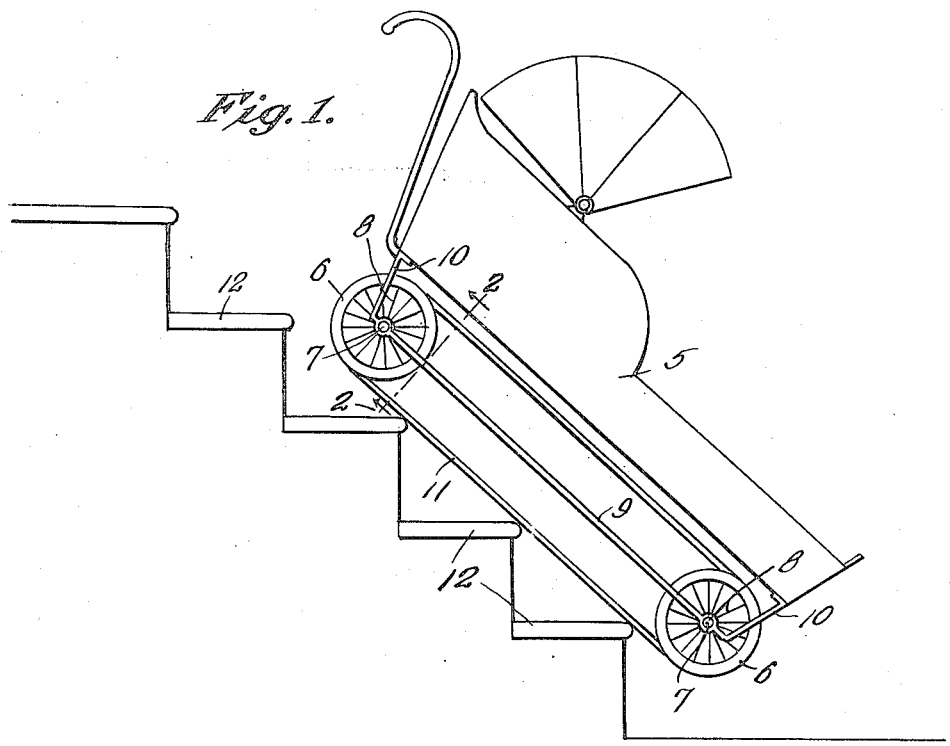
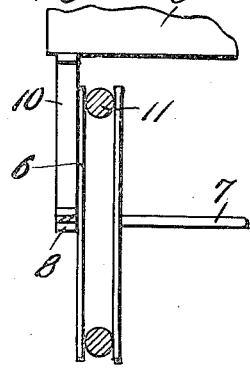
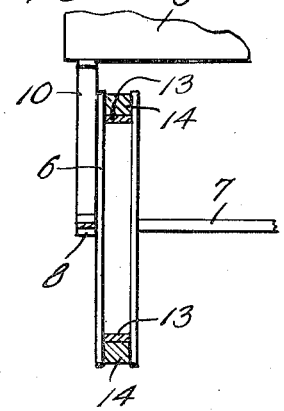
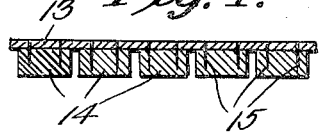
INVENTOR
Willie A. Rainville,
WITNESSES
James F. Crown
BY Richard B. Owen
ATTORNEY

UNITED STATES PATENT OFFICE.

WILLIE ALEXANDER RAINVILLE, OF ST. JEROME, QUEBEC, CANADA.

BABY-CARRIAGE.

1,318,592.     Specification of Letters Patent.     Patented Oct. 14, 1919.

Application filed March 6, 1918. Serial No. 220,782.

*To all whom it may concern:*

Be it known that I, WILLIE A. RAINVILLE, a subject of the King of Great Britain, residing at St. Jerome, in the Province of Quebec and Dominion of Canada, have invented certain new and useful Improvements in Baby-Carriages, of which the following is a specification.

My invention relates to a means whereby a portable body, particularly, a baby carriage, may be moved or travel on steps with facility and without the exertion and danger now experienced.

A particular desideratum is to provide a taut means movable with the wheels of the body and engageable with steps or other irregularities to facilitate ascent or descent. More particular objects and advantages will appear as the description progresses hereinafter with relation to accompanying drawings illustrating one preferred embodiment and wherein:—

Figure 1 is a view in side elevation illustrating a baby carriage constructed in accordance with my improvements and traveling on steps;

Fig. 2 is a fragmentary cross sectional view on the line 2—2 of Fig. 1;

Fig. 3 is a view similar to Fig. 2 but taken through a modified form, and

Fig. 4 is a longitudinal sectional view of the tread employed in Fig. 3.

Referring specifically to the drawings, let the baby carriage or body 5 be diagrammatic and conventional as the traction means is applicable to traveling bodies generally. This body has usual wheels 6 mounted on axles 7 which are fastened in bearings 8 of elongated brackets 9, extending between the front and rear wheels and having upwardly extending fastening arms 10 suitably secured to the bottom of the body. The wheels are peripherally grooved as shown in Fig. 2.

Passing over the wheels 6 and in the grooves thereof, are endless traction members, which may be in the form of endless cables 11, of any desired flexible material.

They may be metallic wires or metallic wires covered with rubbers. These cables are maintained very taut. When the carriage or other body travels over steps 12 as suggested in Fig. 1, the traction cable engages the edges of the treads so that it may easily slide upwardly or downwardly as desired. As the carriage slides, the wheels turns so that the cables turn and undue friction is avoided. On a level surface, the traction occurs on the wheels as the same preferably extend slightly beyond the cables and engage said surface.

In some instances, I may desire to employ a cable which is not round in cross section, but perhaps rectangular as shown at 13 in Figs. 3 and 4. To this cable, traction blocks 14, may be fastened if desired, to directly engage the steps. These blocks may be of any preferred construction and fastened in place by any suitable means. Preferably however, they are secured in place to the cable by staples or nails 15, and the blocks are of wood or rubber.

Other changes in the details of construction may be resorted to without departing from the spirit and scope of the invention as may be apparent.

I claim:—

A baby carriage including wheels arranged fore and aft each of which has a peripheral groove providing flanges to engage the road of travel, and a traction belt trained over the front and rear wheels on each side of the carriage to capacitate as a traction surface when ascending or descending steps.

In testimony whereof I have affixed my signature in presence of two witnesses.

WILLIE ALEXANDER RAINVILLE.

Witnesses:
   SAMUEL THIBAUDEAU,
   MICHEL PRUDHOMME.